Feb. 22, 1927.

P. P. PIPES

ARC WELDING SYSTEM

Filed Sept. 16, 1926

1,618,672

Witness:
H. J. Stromberger

Inventor
PLINY P. PIPES
By
Attorney

Patented Feb. 22, 1927.

1,618,672

UNITED STATES PATENT OFFICE.

PLINY P. PIPES, OF MANSFIELD, OHIO, ASSIGNOR TO THE OHIO BRASS COMPANY, OF MANSFIELD, OHIO, A CORPORATION OF NEW JERSEY.

ARC-WELDING SYSTEM.

Application filed September 16, 1926. Serial No. 135,740.

My invention relates to a method and means therefor to control a welding arc, and which will reduce and limit the voltage of the arc below that of the source of supply and also to limit the length to which the arc may be drawn.

By limiting the length of the arc the deposited metal is more homogeneous and less apt to be oxidized than where a long arc is used and the desposited metal is more apt to be soft rather than hard.

Another result of the use of a short or limited arc is to prevent the spatter of the molten metal and to render more uniform the flow of the metal under the action of the arc.

A long arc may be secured by placing the electrode in series with a resistance, connected to the source of supply, to reduce the current in the arc. This arc is very long, especially when the source of supply is a 500 volt circuit, as when the source of supply is the trolley of a railway circuit.

A short arc may be obtained by placing a shunt resistance around the arc described above.

There is considerable tendency for a long arc to "roam" or "waver", and it is difficult to hold the arc at a given point and the work is very likely to be burned.

In the short arc the voltage is limited and this limitation is brought about by the use of the shunt resistance of proper value in parallel with the arc.

The use of a resistance in series with an arc and connected to the source of supply for regulating the current flow is old in the art and the use of a shunt in parallel with the arc is shown in Kingsland Patent No. 1,542,702, dated June 16, 1925, but in the Kingsland arrangement the controlling resistance and the shunt resistance are constantly in circuit after being made regardless of whether the arc is in operation or not.

In my apparatus I have provided automatic means for interrupting the flow of current whenever the arc is broken and to establish and maintain a flow of current whenever the arc is in operation.

Such an arrangement I find, has the advantage that the current capacity of the shunt resistance can be very materially reduced as compared with that of Kingsland, and I found the current capacity of the resistance in my apparatus may be reduced to as much as one-fifth of the value in the Kingsland device and still properly control the arc.

Also, in my apparatus it is possible to increase the arc striking voltage thereby resulting in much greater ease in striking the arc as later described. Also, there is a very great reduction in the power consumption, and I also find that there is a less temperature rise in the main or controlling resistance thereby tending to a longer life for the apparatus.

Figure 1:
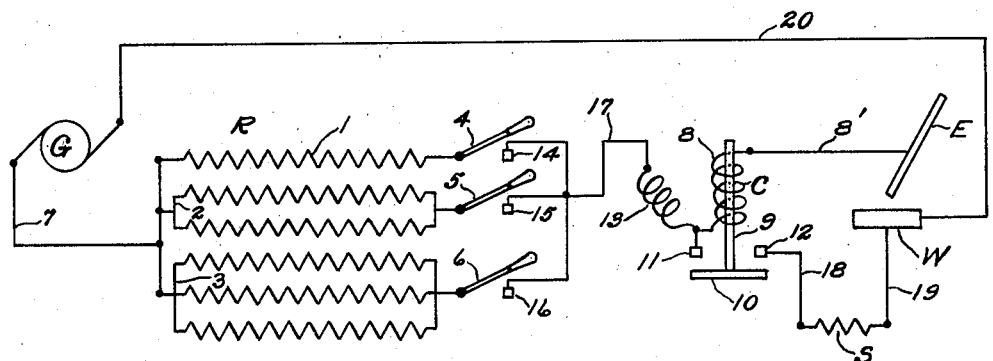
Fig. 1 is a schematic arrangement of the apparatus which I employ as connected to a source of power comprising a generator and before an arc has been struck between the electrode and the work.

In the preferred embodiment of my invention I employ a controlling resistance R, which I have shown as made up of three separate units 1, 2 and 3 and each of a different capacity, and each controlled by a separate switch 4, 5 and 6 respectively.

One end of each resistance unit is connected to the generator G by means of a conductor 7.

The resistance units 1, 2 and 3 may be properly mounted in a frame, as is well known by those skilled in the art, and which may be of one or many designs.

The resistance of the units 1, 2 and 3 can, of course, be varied to meet the current requirements, and the function of the resistance R is mainly to control the amount of current which can flow through the arc.

I also employ a circuit closer C, which is provided with an operating coil 8, a plunger 9 and a connecting element 10 adapted to engage the fixed contacts 11 and 12 and connect these contacts electrically when the coil 8 is energized.

As the switch C normally opens under load, I employ a magnetic blow-out to extinguish the arc, and have shown this as represented by the coil 13 in series with the coil C.

I am not claiming any specific detailed construction of the switch C for the reason that there is nothing new or novel in such switch, but there are a number of such devices on the market which can be employed so long as the switch functions as described herein.

The switches 4, 5 and 6 are provided with fixed contacts 14, 15 and 16 respectively, and these are connected to the coil 13 by means of the conductor 17 and its branches. One end of the coils 8 and 13 are connected to the fixed contact 11 and the other end of the coil C is arranged to be connected to the electrode E, which may be either of metal or carbon through the conductor 8'.

The contact 12 is connected to the work W through the conductors 18 and 19 and the shunt resistance S, and the work W is connected to the generator G through the conductor 20.

It will be noted that when the switch C is open, as shown in Fig. 1, that no current can flow to the work through the shunt resistance S, and when the arc is not playing between the electrode E and the work W no current will flow through the coil 8 thereby permitting the switch C to open and all flow of current ceases.

In the operation of my invention, the operator will close one or more of the switches 4, 5 and 6 as necessary to give him the desired amount of current in the arc. The operator then engages the electrode E with the work W and immediately current flows, as will be obvious, and the coil 8 is energied thereby moving the connecting bar 10 into engagement with the contacts 11 and 12 thereby closing the circuit first from the generator through the resistance R, coil 8 and electrode E in contact with the work W, and then from the generator through the resistance R and through the connecting bar 10 and shunt resistance S to the work W. When the electrode E first contacts with the work W, the switch C is open and the full voltage of the generator is available at the electrode for starting the arc as soon as the electrode is withdrawn from the work. There is an interval of time required for the magnetism of the switch C' to build up sufficiently to close the switch, and while this interval is short it is sufficient to permit the operator to remove the electrode from the work W practically at the full voltage of the generator thereby preventing to a large extent the tendency for the electrode to freeze, as is the case where the voltage across the electrode and work is small, as would be the case if the shunt S was thrown across the electrode and work instantly upon the contacting of the electrode with the work. The interval of time referred to can be varied by a spring or dash pot controlling the members 9 and 10 or by magnetic means, as is well known in the art, or the closing of the switch C can be substantially simultaneous with the contacting of the electrode with the work.

Figure 2:
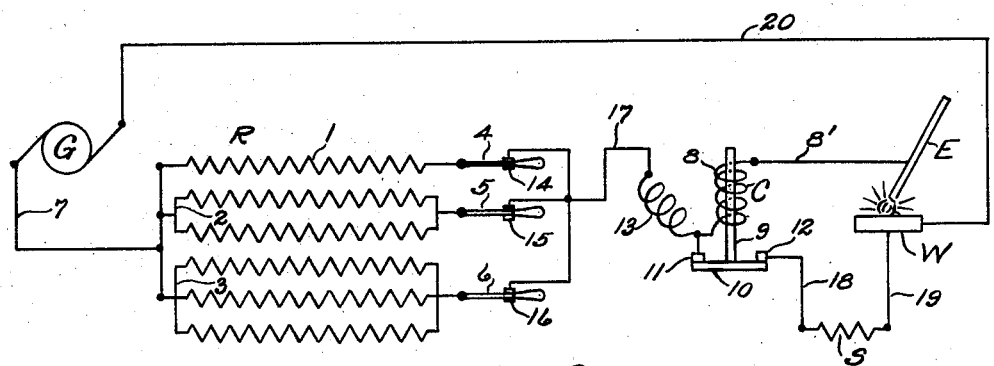
Fig. 2 shows the same arrangement after an arc has been struck between the electrode and the work.

Having established an arc between the electrode E and the work W, as shown in Fig. 2, current will continue to flow between the electrode E and the work W as long as the distance between electrode and work is not too great to maintain the arc, and this will maintain the coil 8 energized and the switch C closed and the shunt S in parallel with the arc. If the separation between the electrode and the work is greater than that which can be maintained by the voltage and current, then the arc will break, current will cease to flow through the coil 8 and the switch C will open thereby disconnecting the shunt S from the supply source and no current will flow through the apparatus, but the arc can be re-established by again contacting the electrode E with the work W.

It will be evident that a considerable amount of saving in current can be brought about by an arrangement as described, as no current will flow when the apparatus is not in operation. Therefore, it is possible to reduce somewhat the current capacity of the resistance R for a given rise in temperature, as the tendency to heat will not be as great as where current flows continuously as in the case of the Kingsland device. Also, the current capacity of the shunt S is materially reduced as compared with that of the Kingsland device.

In order to secure good results, I find that the resistance value of the shunt S should be variable, that is, the resistance of this shunt may be small (approximately .35 ohms) for large arc current values (from 150 to 200 amperes), whereas for small arc current values (from 100 to 150 amperes) the shunt resistance may be larger (approximately .45 ohms). This condition holds true in both the Kingsland device and my own, but the maximum current capacity of the shunt S, in my scheme, may be about 40 amperes, whereas with the Kingsland device a maximum capacity of about 175 amperes is required, as the Kingsland shunt is in circuit with the main controlling resistance when the arc is broken and thus carries at such times approximately the full current values.

This reduced current capacity required in my apparatus, I find, materially decreases the cost, size and weight of my apparatus.

Observation has shown me that when one is welding he seldom keeps an arc formed more than 50% of the time that he is welding under the best conditions, therefore, the automatic feature, as just described, whereby the current flow is stopped when welding ceases, will result in a saving of at least one-half of the power used where the controlling resistance or shunt, or both, are in circuit continuously.

Figure 3:
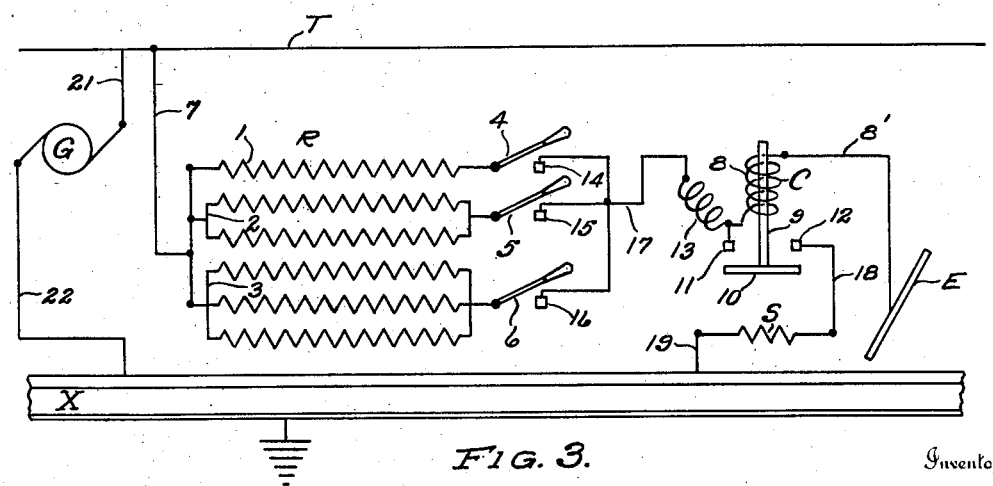
Fig. 3 shows the same arrangement as connected to a source of power through the medium of a trolley wire and the ground, as would be the case when welding is being carried out in connection with the rails or bonds, etc., employed in electric railways.

In the arrangement shown in Fig. 3 the generator G is connected to the trolley T through the conductor 21 and to the rail X through the conductor 22. The resistance R is connected to the generator G by means of the conductor 7 which is connected to the trolley T. In Fig. 3 I have shown the work as constituting the rail X and, therefore, the electrode E is arranged to contact with the rail X and the shunt S as well. It will be noted that there is no difference in the apparatus as such between that shown in Figs. 1 and 3.

All the parts that constitute the apparatus can be mounted in a single unit, as for instance, the resistance R can be mounted in a frame and the switch C also mounted upon this frame and the switches 4, 5 and 6 mounted upon a panel board secured to the frame, and those skilled in the art will readily conceive of other arrangements and connections which may be employed to bring about the same results, therefore, I do not wish to be limited other than by my claims.

I claim:

1. An arc welding system comprising a source of energy, a welding arc connected to the source of energy and with a resistance in series to limit the maximum current flowing through the arc and a shunt of lower resistance than that of the first said resistance in parallel with the arc to limit the length to which the arc can be drawn when welding and means to prevent the flow of current through the shunt when the arc is broken.

2. An arc welding system comprising a source of energy, a welding arc connected to the source of energy and with a resistance in series to limit the maximum current flowing through the arc and a shunt of lower resistance than that of the first said resistance in parallel with the arc to limit the length to which the arc can be drawn when welding and means to prevent the flow of current through the series resistance when the arc is broken.

3. An arc welding system comprising a source of energy, a welding arc connected to the source of energy and with a resistance in series to limit the maximum current flowing through the arc, a shunt resistance in parallel with the arc to limit the length to which the arc may be drawn and means to maintain the shunt while the arc is maintained and to automatically disconnect the shunt when the arc ceases.

4. An arc welding system comprising a source of energy, a welding arc connected to the source of energy and with a resistance in series to limit the current flowing through the arc, a shunt resistance in parallel with the arc to limit the length of the arc to which it can be drawn and means to automatically connect the shunt across the arc when current flows through the arc and maintain the shunt while the arc current is flowing.

5. In an arc welding system, an electric arc, means connected in parallel with the arc to limit the length to which the arc may be drawn and electro-responsive means to connect and maintain the first means across the arc while welding.

6. In an arc welding system, an electric arc, means to permit and to limit the current flow when the arc is formed and means automatically connected in parallel with the arc to limit the length to which the arc may be drawn when the arc is formed.

7. In an arc welding system, an electric arc, means to limit the current flow through the arc and means to connect a shunt resistance in parallel with the arc after the arc has been established.

8. In an arc welding system, an electric arc, means to control the current through the arc a resistance connected in parallel with the arc and means to automatically remove the connection of the said resistance when the arc is broken.

9. In an arc welding system, an electric arc, means to control the current flow through the arc, a resistance connected in parallel with the arc and means preventing the flow of current through the system when the arc is broken.

10. An arc welding system comprising a source of energy, a resistance connected to the source of energy and to an electrode to control the flow of current to the electrode, a shunt resistance to be connected in parallel with the arc, a normally open electro-responsive switch having its operating coil in series with the said resistance and electrode and arranged to connect the shunt resistance in parallel with the arc when the said operating coil has been energized.

11. In an arc welding system, a source of energy, resistance means in series with an electrode and the work to be welded and connected across the source of energy, a shunt resistance to be connected in parallel with the arc formed between the electrode and the work and receiving current from the source and means to break the connection of the shunt with the source of energy when the arc is broken.

12. In an arc welding system, a trolley wire, a track comprising one or more rails, a source of power connected to the trolley wire and to the track, a welding device connected between the trolley and the track to control current to a welding arc and comprising a resistance element to control and limit the current, an electrode to engage the track rail and to form an arc therewith when removed slightly from the rail, means to form a shunt across the arc and means to cut the shunt "in" across the arc when the electrode engages the track rail and to cut the shunt "out" when the arc is broken.

In testimony whereof I affix my signature.

PLINY P. PIPES.